H. G. WHEELER.
SOIL PIPE CONNECTION FOR WATER CLOSETS.
APPLICATION FILED SEPT. 30, 1915.
1,164,771.  Patented Dec. 21, 1915.
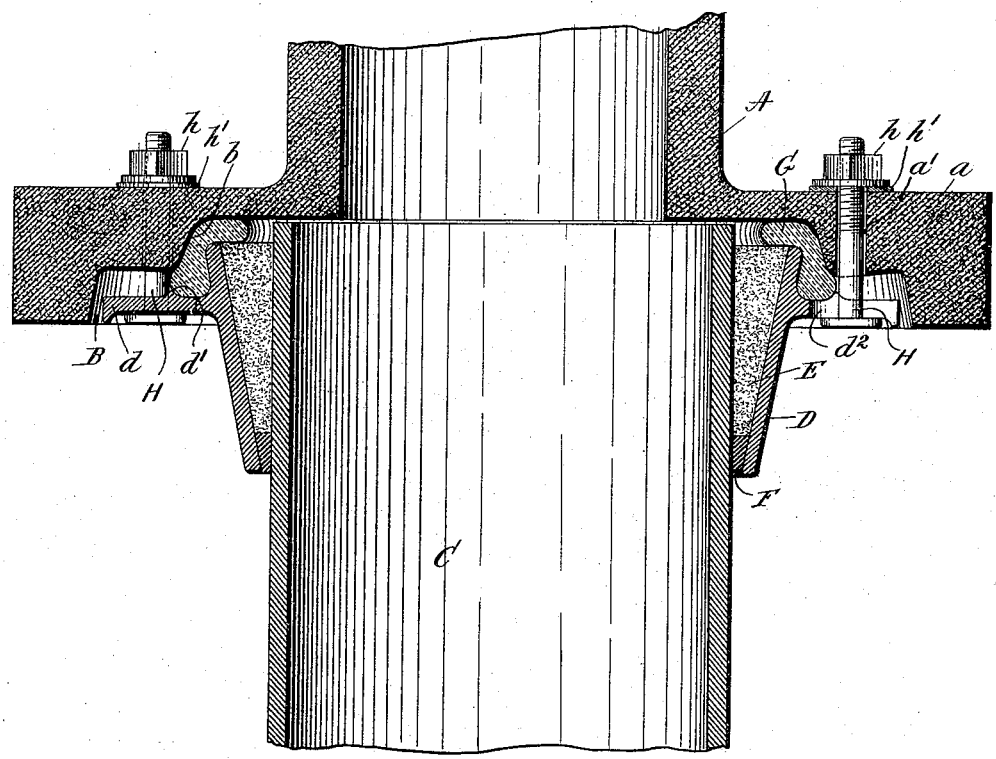
INVENTOR:
Henry G. Wheeler
by Franklin F. Philips, Jr.
Attorney

UNITED STATES PATENT OFFICE.

HENRY G. WHEELER, OF ARLINGTON, MASSACHUSETTS.

SOIL-PIPE CONNECTION FOR WATER-CLOSETS.

1,164,771.  Specification of Letters Patent.  Patented Dec. 21, 1915.

Application filed September 30, 1915. Serial No. 53,294.

*To all whom it may concern:*

Be it known that I, HENRY G. WHEELER, a citizen of the United States, residing at Arlington, in the county of Middlesex and Commonwealth of Massachusetts, have invented certain new and useful Improvements in Soil-Pipe Connections for Water-Closets, of which the following is a specification.

My invention relates to means for making a water-tight joint between the end of a soil pipe and the base of a water-closet hopper and it has been the special object of my invention to provide a simple means which shall seal the joint through the use of a gasket of rubber, or some other elastic material, by obtaining a firm and effective engagement of the connecting parts with the gasket in such a manner that the gasket shall not in time become so flattened and thinned by the pressure thereon as no longer to afford a tight sealing means.

My device may be best understood by reference to the accompanying drawing which shows in vertical cross-section the base of a water-closet hopper and a soil pipe connected by the means herein disclosed.

Referring now more particularly to the drawing, in which like reference characters indicate like parts, A is the base of a water-closet hopper which has a flat base $a$ arranged to rest on a floor. The base $a$ is provided with an annular cavity B of varying depth as shown in the drawing, the deeper portion having an inwardly sloping side $b$.

C represents the soil pipe the top of which is embraced by an annular metallic collar D which is attached thereto by a lead packing E resting on an oakum base F. The collar D is provided with a floor-flange $d$ at a sufficient distance from the top thereof to permit the top to enter into the deeper portion of the cavity B and take a position opposite the sloping side $b$ while the floor-flange itself enters the wider and more shallow part of the cavity B which part is, however, considerably deeper than the thickness of the floor-flange. The floor-flange $d$ has upon its upper side an annular lip $d^1$ to support the lower edge of an annular gasket G made of rubber or some other elastic material and shaped to fit the cavity between the top of the collar D and the opposite surface of the cavity B. The floor-flange $d$ is provided with slots $d^2$ by means of which the bolts H may be entered therein which, passing through holes $a'$ in the base $a$ of the hopper A, permit the soil pipe with its attached collar to be drawn toward the hopper by screwing the nuts $h$ downward upon washers $h^1$ which rest upon the top of the base $a$, thus causing the top of the collar D and the floor-flange $d$ to press the gasket G firmly into engagement with the opposite surface of the cavity B. It will be observed that the collar D flares outwardly at its top, thereby slanting toward the sloping surface $b$ of the cavity B, thus causing the gasket to be pressed hard against this surface and wedged tightly between the opposing members while its lower edge is restrained from a tendency toward outward flowing or creeping by the lip $d^1$. It will be quite apparent that pressure upon the gasket caused by different surfaces arranged at different angles on either side of the gasket will effectively seal the joint at one or more places on each side of the gasket in spite of any slight irregularities which may exist in the structure or arrangement of the parts.

While my device is particularly useful for the connections of a soil pipe with a water closet hopper, still I do not limit the scope of my invention to this use for it is plain that a similar construction may be used for connecting soil pipe with other objects.

Having thus fully described my invention what I claim is—

1. In a device of the character specified a member provided with an annular cavity of varying depth in the base thereof, a collar adapted to embrace the top of a soil pipe and enter said cavity, said collar being provided with a floor-flange located below the top thereof, a gasket arranged to form a seal between the outer top portion of said collar and top of said floor-flange on one side and the surface of said annular cavity on the other side, and means for drawing said member provided with a cavity and said collar into firm engagement with said gasket.

2. In a device of the character specified a member provided with an annular cavity of varying depth in the base thereof, said cavity having a surface slanting inwardly toward its deeper portion, an outwardly slanting collar adapted to embrace the top of a soil pipe and enter the deeper portion of said cavity opposite said slanting surface, said collar being provided with a floor-flange located below the top thereof, a gasket arranged to form a seal between the outer top portion of said collar and the top of said floor-flange on one side and the surface of said annular cavity on the other side, and means for drawing said member provided with a cavity and said collar into firm engagement with said gasket.

3. In a device of the character specified a member provided with an annular cavity of varying depth in the base thereof, said cavity having a surface slanting inwardly toward its deeper portion, an outwardly slanting collar adapted to embrace the top of a soil pipe and enter the deeper portion of said cavity opposite said slanting surface, said collar being provided with a floor-flange located below the top thereof, and having an annular lip, a gasket arranged to form a seal between the outer top portion of said collar and the top of said floor flange on one side and the surface of said annular cavity on the other side, and means for drawing said member provided with a cavity and said collar into firm engagement with said gasket.

HENRY G. WHEELER.

Witnesses:
FRANKLIN F. PHILLIPS, Jr.,
MARY E. O'CONNELL.

Copies of this patent may be obtained for five cents each, by addressing the "Commissioner of Patents, Washington, D. C."